United States Patent
Suwada

(10) Patent No.: US 8,331,431 B2
(45) Date of Patent: *Dec. 11, 2012

(54) SIGNAL TRANSMISSION APPARATUS AND METHOD OF CONTROLLING THE APPARATUS

(75) Inventor: Makoto Suwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 811 days.

This patent is subject to a terminal disclaimer.

(21) Appl. No.: 12/507,354

(22) Filed: Jul. 22, 2009

(65) Prior Publication Data

US 2010/0020858 A1 Jan. 28, 2010

(30) Foreign Application Priority Data

Jul. 28, 2008 (JP) ................................. 2008-193701

(51) Int. Cl.
*H04B 3/46* (2006.01)
(52) U.S. Cl. ........ 375/224; 375/225; 375/226; 375/227; 375/228; 375/219; 375/295; 370/229; 370/235
(58) Field of Classification Search .................. 375/224, 375/225, 226, 227, 228, 219, 295; 370/229, 370/235
See application file for complete search history.

(56) References Cited

U.S. PATENT DOCUMENTS

| 7,447,260 B2 | 11/2008 | Takahashi |
| 2006/0204245 A1 | 9/2006 | Tanabe |

FOREIGN PATENT DOCUMENTS

| JP | 2004-15622 A | 1/2004 |
| JP | 2006-246191 A | 9/2006 |

*Primary Examiner* — Zewdu Kassa
(74) *Attorney, Agent, or Firm* — Westerman, Hattori, Daniels & Adrian, LLP

(57) ABSTRACT

According to an aspect of the embodiment, According to an aspect of the invention, a signal transmission apparatus transmits a first signal to a transmission line. The apparatus measures a reflection characteristic of the transmission line based on a signal resulting from reflection of the first signal, and measures a transmission characteristic of the transmission line based on a signal resulting from transmission of the first signal through the transmission line. The apparatus determines a transmission clock frequency and a multi-value number based on the reflection characteristic and the transmission characteristic, and modulates information using the transmission clock frequency and the multi-value number to transmit a second signal resulting from the modulation to the transmission line. The apparatus receives the second signal through the transmission line and demodulates the received second signal.

20 Claims, 8 Drawing Sheets

FIG. 5

| DETERMINATION PATTERN NUMBER | FREQUENCY RANGE | MULTI-VALUE NUMBER | INSERTION LOSS CONDITION | REFLECTION LOSS CONDITION |
|---|---|---|---|---|
| 1 | 1 GHz–2 GHz | 8 | IL1 ≥ −15 | RL1 ≤ −12.5 |
| 2 | 1 GHz–3 GHz | 4 | IL2 ≥ −17.5 | RL2 ≤ −10 |
| 3 | 1 GHz–5 GHz | 2 | IL ≥ −22.5 | RL ≤ −7.5 |

FIG. 7

| DETERMINATION PATTERN NUMBER | FREQUENCY RANGE | MULTI-VALUE NUMBER | INSERTION LOSS CONDITION | DETERMINATION RESULT OF INSERTION LOSS | REFLECTION LOSS CONDITION | DETERMINATION RESULT OF REFLECTION LOSS |
|---|---|---|---|---|---|---|
| 1 | 1 GHz–2 GHz | 8 | IL1 ≥ −15 | ○ | RL1 ≤ −12.5 | ○ |
| 2 | 1 GHz–3 GHz | 4 | IL2 ≥ −17.5 | ○ | RL2 ≤ −10 | ○ |
| 3 | 1 GHz–5 GHz | 2 | IL ≥ −22.5 | ○ | RL ≤ −7.5 | ○ |

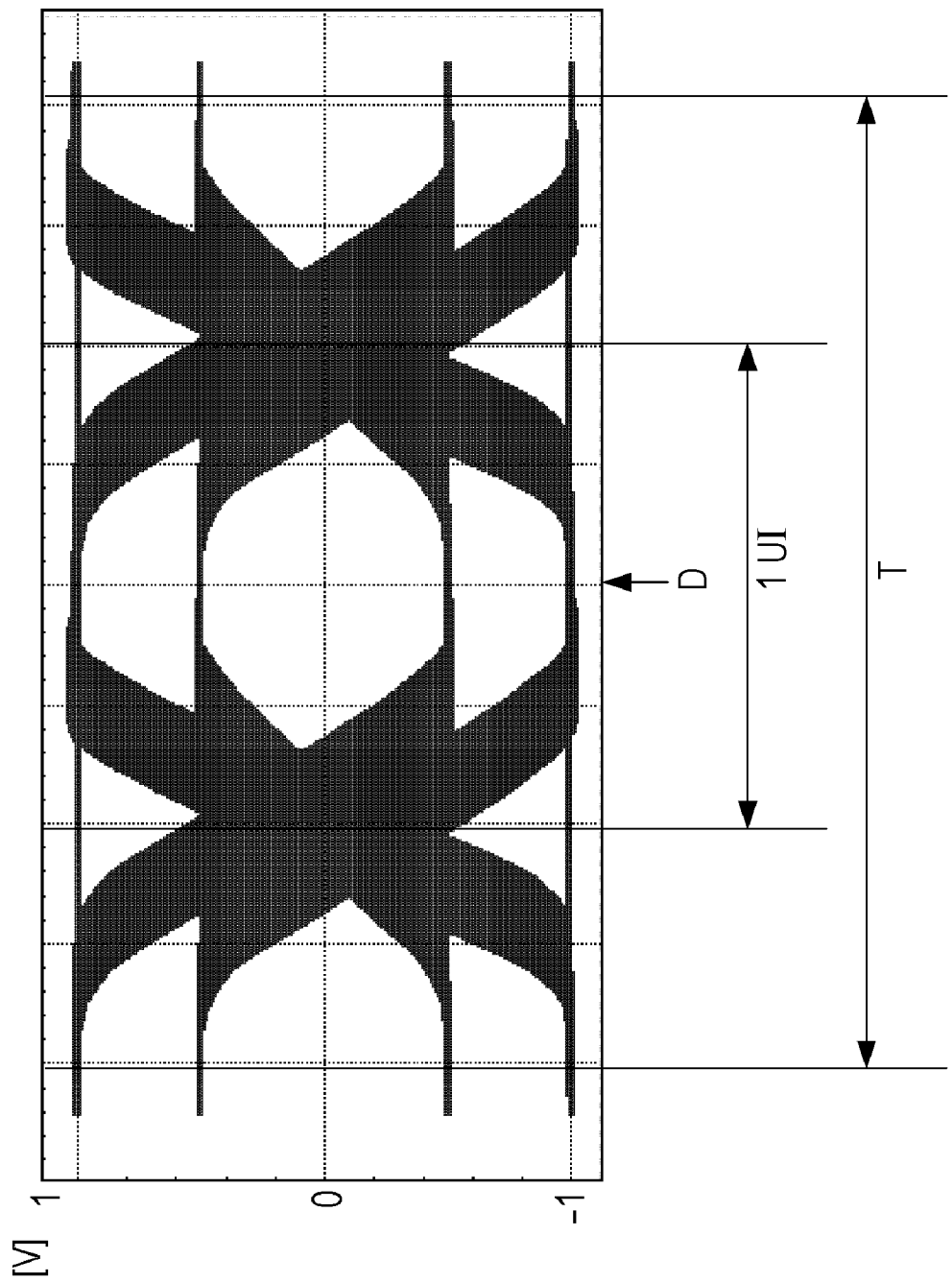

SIGNAL TRANSMISSION APPARATUS AND METHOD OF CONTROLLING THE APPARATUS

CROSS-REFERENCE TO RELATED APPLICATIONS

This application is based on and claims the benefit of priority of the prior Japanese Patent Application No. 2008-193701, filed on Jul. 28, 2008, the entire contents of which are incorporated herein by reference.

BACKGROUND

1. Field

The present invention relates to a signal transmission apparatus that transmits a signal through a transmission line and to a method of controlling the signal transmission apparatus.

2. Description of the Related Art

In recent years, Peripheral Component Interconnect (PCI) and PCI-X used in personal computers and servers are being replaced with PCI Express. Similarly, Advanced Technology Attachment (ATA) used in connection with storage devices, such as a hard disk drive (HDD) and a compact disk-read only memory (CD-ROM), is being replaced with Serial ATA and Small Computer System Interface (SCSI) is being replaced with Serial Attached SCSI.

In other words, signal transmission interfaces (electrical interfaces) are being rapidly changed from parallel interfaces to serial interfaces.

Since the serial interfaces use bandwidths wider than those of the parallel interfaces, a method is required to accurately detect any loss, jitter, noise, and/or variation on the transmission lines in order to achieve more stable transmission waveforms.

The serial interfaces each include transmission large scale integration (LSI) that transmits a signal waveform, a transmission line including a printed circuit board, a connector, and a cable, a reception LSI that receives a signal waveform, and so on.

In design of a high-speed transmission system having a transmission speed on the order of gigahertz, it is necessary to achieve an optimal transmission quality in consideration of the performances of a transmitter and a receiver, a variation in characteristics between the materials of devices and circuit boards, the characteristics of each element composing the transmission line, and noise.

A typical transmission system in related art includes a printed circuit board, a cable, and a connector, in addition to a transmission LSI and a reception LSI. Transmission and reception performances, a variation in characteristics between the materials of the LSIs, a power supply noise and a crosstalk noise, the amount of reflection, a loss in a package including printed circuit board (PCB) wires, via holes, cables, connectors, and transmission and reception LSIs, etc., should be considered in the transmission system in the related art.

An equalizer apparatus that automatically sets an equalization parameter and a pre-emphasis adjusting method for reducing the time necessary for the pre-emphasis adjustment are proposed in the related art (for example, refer to Japanese Unexamined Patent Application Publication Nos. 2004-15622 and 2006-246191).

In general high-speed transmission, an eye opening of a received signal and an equalizer are adjusted by emphasis adjustment.

However, since a predetermined transmission clock frequency and multi-value number are used in the general high-speed transmission, the optimal transmission method is not necessarily achieved.

A transmission-reception circuit having a large number of ports is included in an LSI with an increasing number of ports used in the high-speed transmission. Accordingly, the transmission quality can possibly be degraded due to open reflection caused in open lanes and/or noises caused by concurrent operation of multiple lanes. Furthermore, it is often considered that increasing the size of an eye opening of a received signal increases the reception margin. However, reception of a waveform having a large eye opening can increase the noise inside the LSI having a large number of ports, thereby also degrading the transmission quality.

SUMMARY

According to an aspect of the invention, a signal transmission apparatus transmits a first signal to a transmission line. The apparatus measures a reflection characteristic of the transmission line based on a signal resulting from reflection of the first signal, and measures a transmission characteristic of the transmission line based on a signal resulting from transmission of the first signal through the transmission line. The apparatus determines a transmission clock frequency and a multi-value number based on the reflection characteristic and the transmission characteristic, and modulates information using the transmission clock frequency and the multi-value number to transmit a second signal resulting from the modulation to the transmission line. The apparatus receives the second signal through the transmission line and demodulates the received second signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a table illustrating an example of a determination table according to the present embodiment;

FIG. 7 is a table illustrating an example of the determination result of an S parameter condition in a frequency and multi-value number determination process according to the present embodiment; and FIG. 8 is a waveform diagram illustrating an example of the eye pattern of a reception signal according to the present embodiment.

BRIEF DESCRIPTION OF EMBODIMENTS

Embodiments of the present invention will herein be described with reference to the attached drawings.

A signal transmission apparatus according to an embodiment of the present invention performs multi-level transmission. The signal transmission apparatus is capable of selecting a multi-value number indicating the number of levels which a transmission signal can have at a data determination timing.

The transmission capacity increases with the increasing number of levels indicated by the multi-value number. The signal transmission apparatus determines a transmission clock frequency and a multi-value number so that the transmission quality and the transmission capacity satisfy predetermined conditions. The transmission clock frequency and the multi-value number determined in the above manner is hereinafter referred to as an optimal frequency and an optimal multi-value number, respectively, in the present embodiment.

The configuration of the signal transmission apparatus according to the present embodiment will now be described.

Figure 1:
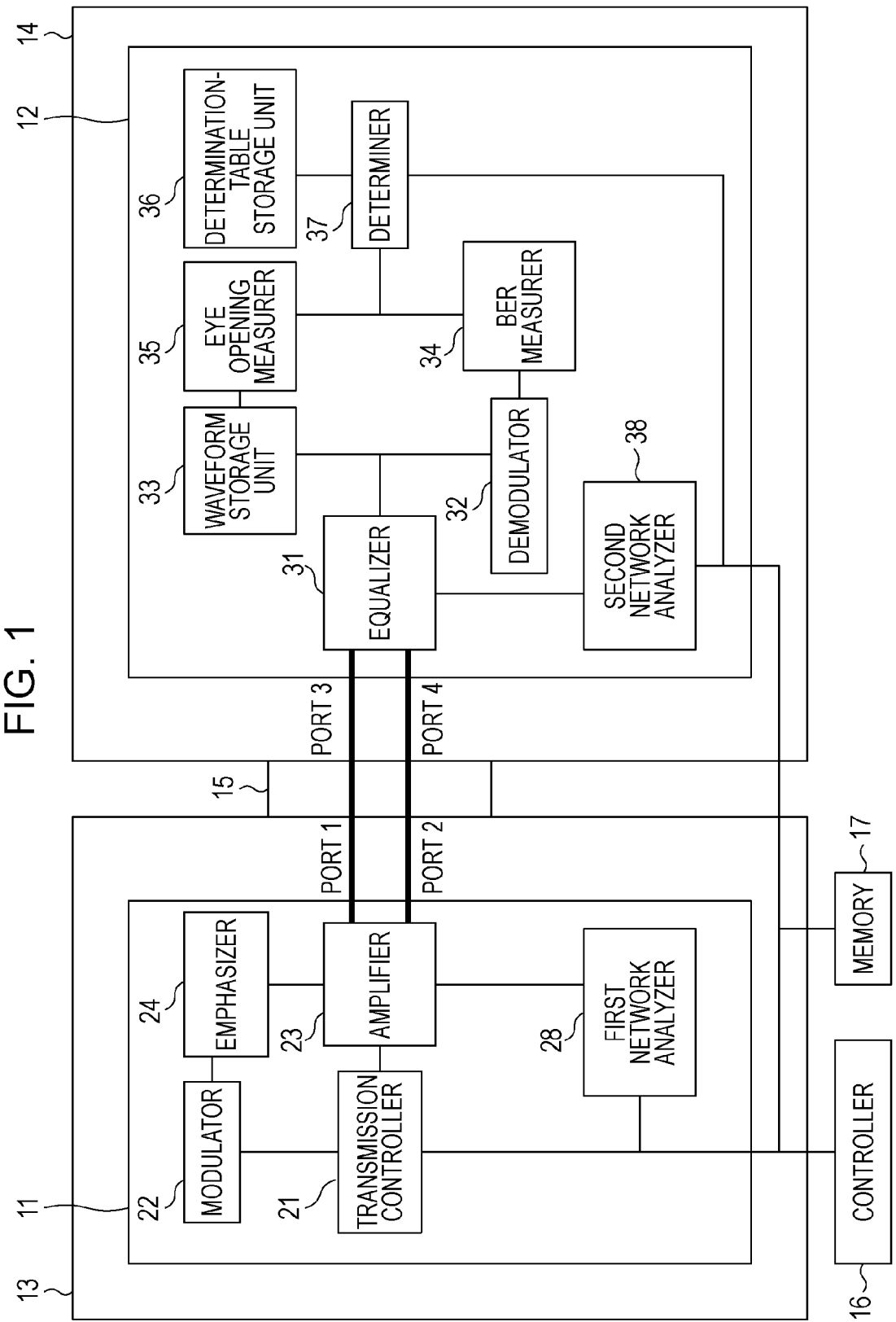
FIG. 1 is a block diagram showing an example of the configuration of a signal transmission apparatus according to an embodiment of the present invention.

FIG. 1 is a block diagram showing an example of the configuration of the signal transmission apparatus according to the present embodiment. The signal transmission apparatus includes a transmission LSI 11, a reception LSI 12, printed circuit boards 13 and 14, a connector 15, a controller 16, and a memory 17. The transmission LSI 11 includes a transmission controller 21, a modulator 22, an amplifier 23, an emphasizer 24, and a first network analyzer 28. The reception LSI 12 includes an equalizer 31, a demodulator 32, a waveform storage unit 33, a bit error rate (BER) measurer 34, an eye opening measurer 35, a determination-table storage unit 36, a determiner 37, and a second network analyzer 38.

The transmission LSI 11 is mounted on the printed circuit board 13. The reception LSI 12 is mounted on the printed circuit board 14.

The transmission LSI 11 is provided with a port 1 and a port 2. The reception LSI 12 is provided with a port 3 and a port 4. The port 1 is connected to the port 3 via a transmission signal line on the printed circuit board 13, the connector 15, and a transmission signal line on the printed circuit board 14. A signal transmitted through the port 1 is received through the port 3. Similarly, the port 2 is connected to the port 4 via the transmission signal line on the printed circuit board 13, the connector 15, and the transmission signal line on the printed circuit board 14. A signal transmitted through the port 2 is received through the port 4.

A signal line including the transmission signal line on the printed circuit board 13, the connector 15, and the transmission signal line on the printed circuit board 14 is hereinafter referred to as a transmission line or a lane.

The components in the transmission LSI 11 and the reception LSI 12 are provided for every lane.

The controller 16, the memory 17, the transmission controller 21, the modulator 22, the equalizer 31, and the demodulator 32 are connected to each other via a control signal line.

Figure 2:
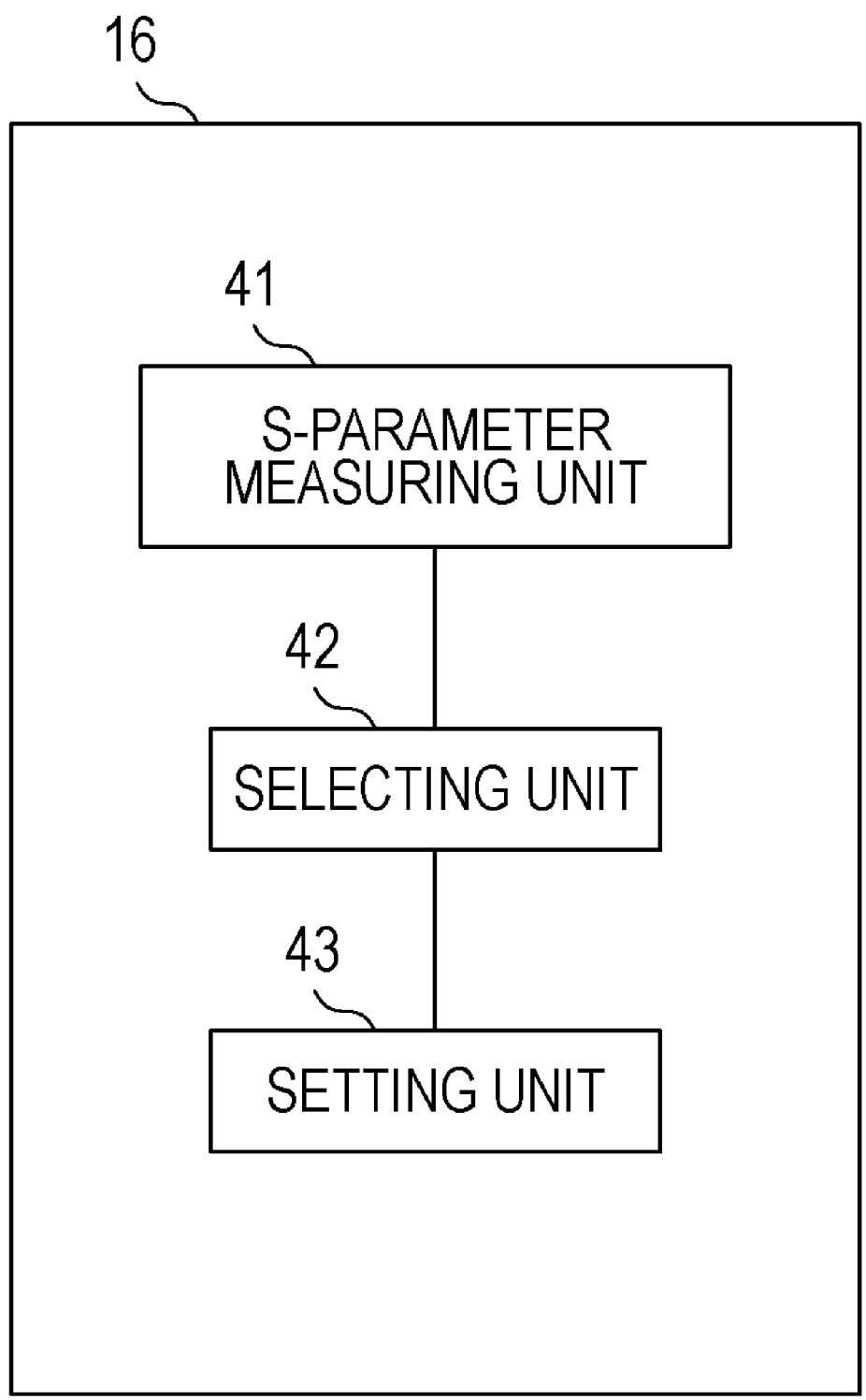
FIG. 2 is a block diagram showing an example of the software configuration of a controller according to the present embodiment.

FIG. 2 is a block diagram showing an example of the software configuration of the controller 16 according to the present embodiment. The controller 16 executes an S-parameter measuring unit 41, a selecting unit 42, and a setting unit 43, which are software. The controller 16 is, for example, a central processing unit (CPU). The S-parameter measuring unit 41, the selecting unit 42, and the setting unit 43 are programs executed by the controller 16 using the memory 17.

The transmission controller 21 determines an open lane in the transmission LSI 11 and controls the amplifier 23. The modulator 22 modulates information to be transmitted by the transmission LSI 11. The emphasizer 24 amplifies a predetermined frequency so as to prevent the waveform on the transmission line from degrading. The amplifier 23 amplifies a signal to be transmitted.

The equalizer 31 equalizes a waveform that is degraded on the transmission line. The demodulator 32 demodulates a signal that is received. The waveform storage unit 33 stores a waveform that is received. The BER measurer 34 measures the BER of a received signal. The eye opening measurer 35 measures the eye opening of a received signal. The determination-table storage unit 36 stores a determination table.

Specifically, the determination-table storage unit 36 stores the determination table used for determining the optimal frequency and the optimal multi-value number in the transmission LSI 11 and the reception LSI 12.

The determiner 37 determines the optimal frequency and the optimal multi-value number based on the determination table.

The first network analyzer 28 transmits a measurement signal (a first signal) used for measuring a scattering parameter (S parameter) to the transmission line and receives a measurement signal reflected from the transmission line to measure a reflection loss (reflection characteristic) of the transmission line. The second network analyzer 38 receives a measurement signal (a second signal) passing through the transmission line to measure an insertion loss (transmission characteristic) of the transmission line.

A first-signal transmitting unit and a second-signal transmitting unit correspond to the transmission controller 21, the modulator 22, the amplifier 23, and the emphasizer 24. A second-signal receiving unit corresponds to the equalizer 31, the demodulator 32, the waveform storage unit 33, the BER measurer 34, and the eye opening measurer 35.

A determining unit corresponds to the determination-table storage unit 36, the determiner 37, the controller 16, and the memory 17.

Referring to FIG. 2, the S-parameter measuring unit 41 issues a measurement instruction to the first network analyzer 28 and the second network analyzer 38 to calculate S parameter characteristics of the transmission line based on the measurement result. The S parameters represent the frequency characteristics of the transmission line. The selecting unit 42 selects amplifier settings set for the amplifier 23, emphasizer settings set for the emphasizer 24, and equalizer settings set for the equalizer 31 based on the S parameter characteristics calculated by the S-parameter measuring unit 41.

Each amplifier setting indicates an amplification characteristic and represents the output amplitude or the amplification factor of the amplifier 23 in the present embodiment. Each emphasizer setting indicates an emphasis characteristic and represents the gain of a frequency that is to be emphasized in the present embodiment. Each equalizer setting indicates an equalization characteristic and represents a center frequency in the present embodiment. The equalizer 31 has a frequency characteristic in which the maximum gain is achieved at the center frequency.

The signal transmission apparatus of the present embodiment may provide an interactive interface using the same transmission line. In this case, the reception LSI 12 further includes the transmission controller 21, the modulator 22, the amplifier 23, the emphasizer 24, and the first network analyzer 28, and the transmission LSI 11 further includes the equalizer 31, the demodulator 32, the waveform storage unit 33, the BER measurer 34, the eye opening measurer 35, the determination-table storage unit 36, the determiner 37, and the second network analyzer 38. This signal transmission apparatus performs transmission from the reception LSI 12 to the transmission LSI 11, in addition to the transmission from the transmission LSI 11 to the reception LSI 12.

The operation of the signal transmission apparatus according to the present embodiment will now be described.

Figure 3:
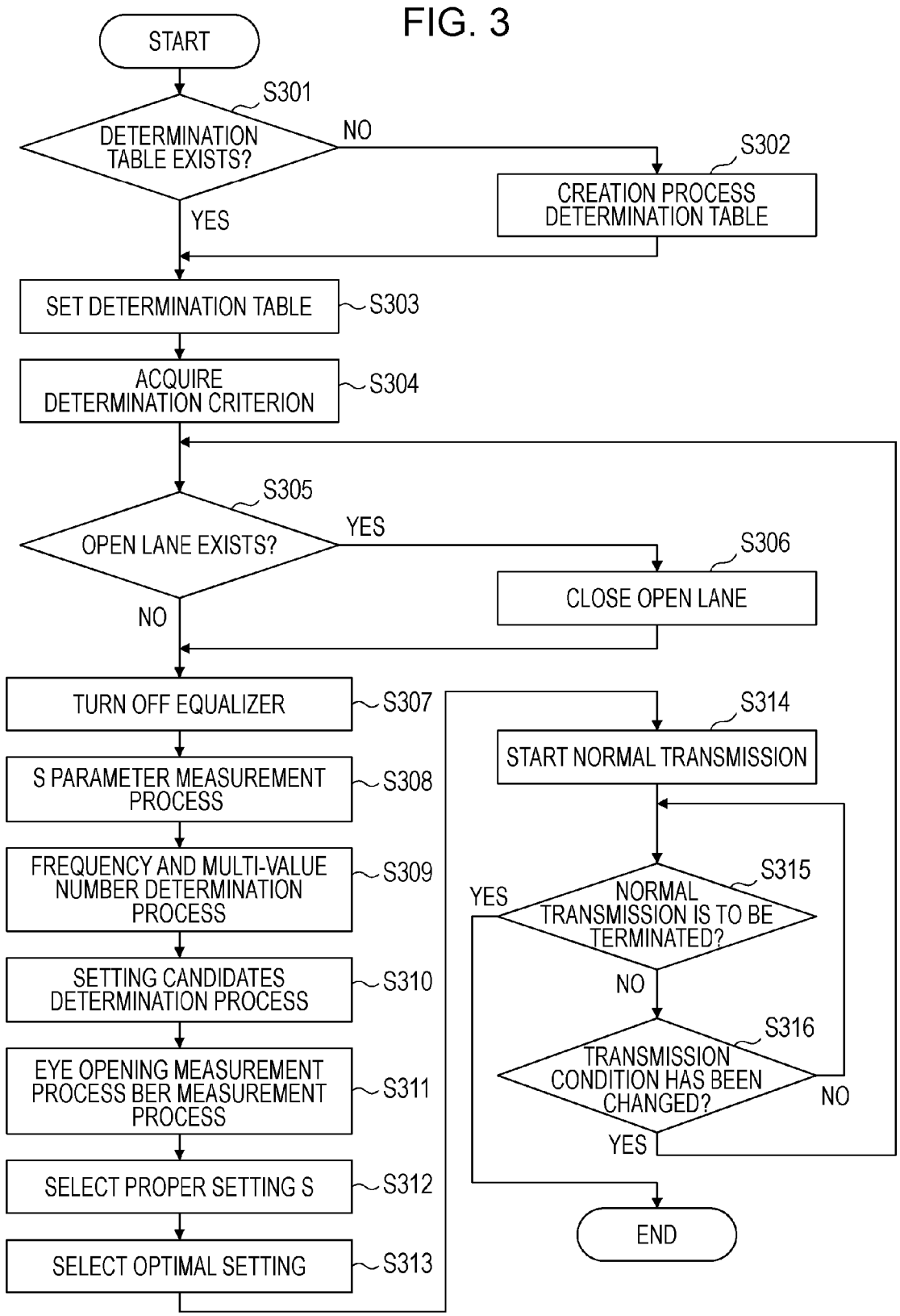
FIG. 3 is a flowchart showing an example of an operational process of the signal transmission apparatus according to the present embodiment.

FIG. 3 is a flowchart showing an example of an operational process of the signal transmission apparatus according to the present embodiment.

Referring to FIG. 3, in Step S301, the setting unit 43 determines whether the determination table exists in, for example, the memory. If the setting unit 43 determines that the determination table exists (YES in Step S301), the process proceeds to Step S303. If the setting unit 43 determines that the determination table does not exist (NO in Step S301), in Step S302, the setting unit 43 performs a determination table creation process to create the determination table and the process proceeds to Step S303. In the determination table creation process, the setting unit 43 acquires information on datasheets of the transmission LSI 11 and the reception LSI 12 (according to the specifications of the LSIs) and creates the determination table from the acquired information. For example, the information on the datasheets is input by a user.

In Step S303, the setting unit 43 acquires the created determination table and sets the acquired determination table in the determination-table storage unit 36.

In Step S304, the setting unit 43 acquires a determination criterion that is specified in advance. The determination criterion is used to determine the optimal frequency and the optimal multi-value number and is set according to the importance of the transmission quality indicating that importance is attached to the transmission quality or importance on the transmission capacity indicating that importance is attached to the transmission capacity. The importance on the transmission quality is used as the determination criterion if the importance on the transmission capacity is not specified in the determination criterion.

In Step S305, the transmission controller 21 determines whether an open lane exists. If the transmission controller 21 determines that an open lane does not exist (No in Step S305), the process proceeds to Step S307. If the transmission controller 21 determines that an open lane exists (YES in Step S305), in Step S306, the transmission controller 21 closes the open lane or sets the output level of the open lane to zero for the amplifier 23 and the process proceeds to Step S307. Determining an open lane that is not required in the transmission and stopping the transmission on the open lane allow the crosstalk caused by the reflection from the open lane and the noise inside the LSI to be suppressed, thereby reducing the BER.

In Step S307, the S-parameter measuring unit 41 turns off the equalizer 31. In Step S308, the S-parameter measuring unit 41 causes the first network analyzer 28 and the second network analyzer 38 to perform an S parameter measurement process for measuring the S parameter.

In Step S309, the determiner 37 performs a frequency and multi-value number determination process for determining the optimal frequency and the optimal multi-value number from the S parameter measurement value measured in the S parameter measurement process and the determination table stored in the determination-table storage unit 36.

In Step S310, the selecting unit 42 performs a setting candidates determination process for determining multiple setting candidates, which are candidates for the settings for the amplifier 23, the emphasizer 24, and the equalizer 31.

In Step S311, the selecting unit 42 sequentially sets combinations of the setting candidates to cause the eye opening measurer 35 to perform an eye opening measurement process and to cause the BER measurer 34 to perform a BER measurement process.

In Step S312, the selecting unit 42 selects proper settings, which are combinations of the setting candidates satisfying a predetermined proper condition, based on the eye opening and the BER for every combination of the setting candidates.

Examples of the proper settings will now be described. The selecting unit 42 uses a setting in which the BER is error free and the eye opening is maximized, a setting in which the BER is error free and the eye opening is minimized, and a setting in which the BER is error free and the eye opening is closest to the central value as the proper settings in a proper condition A. The central value indicates the average of the maximum value and the minimum value. The selecting unit 42 uses settings in which the BER is error free and the eye opening is within a range that is set in advance as the proper settings in a proper condition B. The user can select the proper condition A or the proper condition B as the predetermined proper condition in advance.

In Step S313, the selecting unit 42 selects an optimal setting, which is a setting satisfying a predetermined optimal condition, from the proper settings and sets the optimal setting in the modulator 22, the emphasizer 24, and the equalizer 31. The optimal condition means that the eye opening is closest to the central value. This step allows noises caused by an eye opening and an amplitude that are too large to be suppressed, thereby improving the reception sensitivity.

In Step S314, the setting unit 43 causes the transmission LSI 11 and the reception LSI 12 to start normal transmission. In Step S315, the setting unit 43 determines whether the normal transmission is to be terminated.

If the setting unit 43 determines that the normal transmission is to be terminated (YES in Step S315), the process is terminated. If the setting unit 43 determines that the normal transmission is not to be terminated (NO in Step S315), in Step S316, the setting unit 43 determines whether a transmission condition has been changed. The transmission condition indicates, for example, the transmission load or the transmission distance.

If the setting unit 43 determines that the transmission condition has not been changed (NO in Step S316), the process goes back to Step S315. If the setting unit 43 determines that the transmission condition has been changed (YES in Step S316), the process goes back to Step S305.

Alternatively, Steps S311 and S312 may be performed for all the combinations of the setting candidates to operate the signal transmission apparatus with the setting candidate having the lowest BER.

The operational process of the signal transmission apparatus according to the present embodiment is not necessarily required to include all the above steps and may perform only the necessary steps.

The frequency and multi-value number determination process in Step S309 in FIG. 3 will now be described.

The determination table includes at least one determination pattern. The determination pattern includes the frequency range of a transmission clock to be set, a multi-value number to be set, and an S parameter condition which the S parameter measurement value should satisfy. The S parameter condition includes an insertion loss condition and a reflection loss condition.

First, the frequency and multi-value number determination process when the importance on the transmission quality is set as the determination criterion will be described. The determiner 37 extracts the determination patterns in which the S parameter measurement values satisfy the S parameter conditions and selects a determination pattern having the minimal multi-value number larger than two from the extracted determination patterns. If the S parameter measurement value does not satisfy all the S parameter conditions in the determination pattern having the multi-value number larger than two, the determiner 37 selects the determination pattern in which the multi-value number is equal to two.

The determiner 37 sets the frequency range and the multi-value number in the selected determination pattern as the optimal frequency range and the optimal multi-value number, respectively. The determiner 37 sets the highest frequency which is within the optimal frequency range and at which the S parameter measurement value satisfies the S parameter condition as the optimal frequency.

Next, the frequency and multi-value number determination process when the importance on the transmission capacity is set as the determination criterion will be described. The determiner 37 selects the determination pattern in the same manner as in the case where the importance on the transmission quality is set as the determination criterion and sets the selected determination pattern as the condition for the importance on the transmission quality. The determiner 37 selects the determination pattern having the largest multi-value number and sets the selected determination pattern as the condition for the importance on the transmission capacity.

If the condition for the importance on the transmission quality is the same as the condition for the importance on the transmission capacity, the determiner 37 determines the optimal frequency range, the optimal multi-value number, and the optimal frequency of the corresponding determination pattern. If the condition for the importance on the transmission quality is different from the condition for the importance on the transmission capacity, the determiner 37 determines the optimal frequency range, the optimal multi-value number, and the optimal frequency in the condition for the importance on the transmission quality to calculate the transmission capacity and determines the optimal frequency range, the optimal multi-value number, and the optimal frequency in the condition for the importance on the transmission capacity to calculate the transmission capacity. The determiner 37 selects the optimal frequency and the optimal multi-value number in the condition having the higher transmission capacity, among the conditions for the importance on the transmission quality and for the importance on the transmission capacity. In the case of a signal transmission apparatus in which no problem occurs if an allowable error rate is rather high, the importance on the transmission capacity is determined.

When multiple determination patterns are selected in the manner as in the importance on the transmission quality, in addition to the importance on the transmission quality and the importance on the transmission capacity, a determination criterion for selecting a determination pattern having the lowest BER may be used.

Alternatively, the frequency having the smallest reflection, among the frequencies satisfying the determination pattern, may be selected as the optimal frequency.

The setting candidates determination process in Step S310 in FIG. 3 will now be described in detail.

In the setting candidates determination process, the selecting unit 42 determines three settings for the amplifier 23, three settings for the emphasizer 24, and three settings for the equalizer 31.

Figure 4:
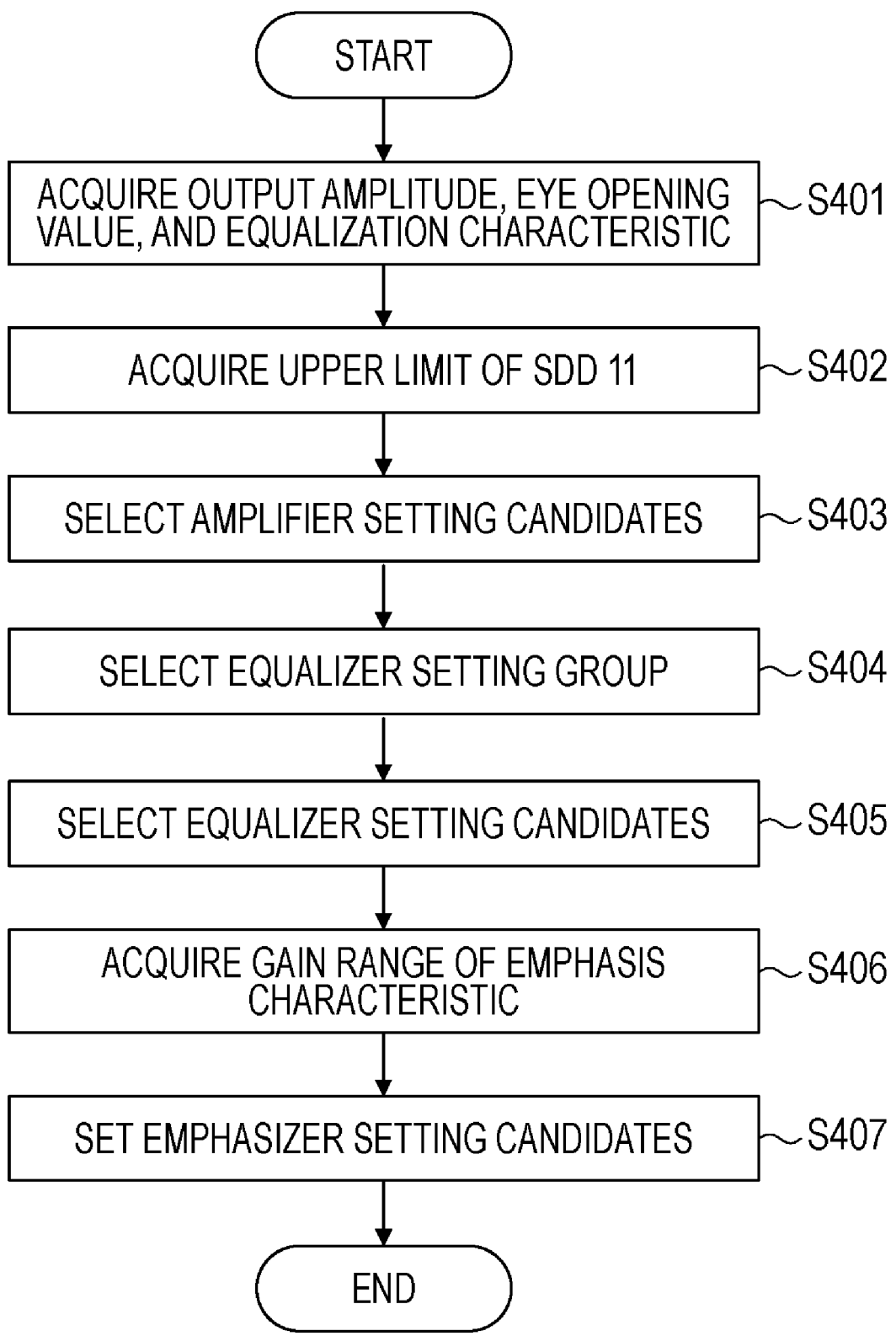
FIG. 4 is a flowchart showing an example of a setting candidates determination process according to the present embodiment.

FIG. 4 is a flowchart showing an example of the setting candidates determination process according to the present embodiment. Referring to FIG. 4, in Step S401, the selecting unit 42 recognizes the output amplitude of each port of the transmission LSI 11 and the eye opening value and the equalization characteristic of each port of the reception LSI 12 and stores the output amplitude, the eye opening value, and the equalization characteristic in the memory 17 as pre-processing. The eye opening value is a value in the amplitude direction. In Step S402, the selecting unit 42 acquires an upper limit (SDD11_lmt) of an SDD 11 (described below) having little effect on the transmission characteristics from the values that are input in advance and stores the acquired upper limit (SDD11_lmt) in the memory 17.

In Step S403, the selecting unit 42 selects three output amplitudes satisfying a predetermined setting condition from all the output amplitudes based on the S parameter measurement value, the output amplitude, and the eye opening value and sets the selected output amplitudes as amplifier setting candidates. The predetermined setting condition means that the input amplitude of the reception LSI 12, which is calculated from the output amplitude in consideration of the transmission loss in the measurement result of the S parameter, satisfies a predetermined condition.

In Step S404, the selecting unit 42 selects all the frequencies at which the SDD 11 is not higher than SDD11_lmt based on the measurement result of the S parameter and groups the selected frequencies into an equalizer setting group. In Step S405, the selecting unit 42 selects the central value in the equalizer setting group, the next higher value of the central value, and the next lower value of the central value as equalizer setting candidates. In Step S406, the selecting unit 42 acquires a gain range of the emphasis characteristic from the values that are input in advance. In Step S407, the selecting unit 42 sets the central value, the maximum value, and the minimum value in the acquired range as emphasizer setting candidates. Then, the setting candidates determination process is terminated.

The signal transmission apparatus realizes the stable transmission having the excellent waveform and reception sensitivity by the above operation using the optimal frequency and the optimal multi-value number.

In addition, it is possible to realize the stable transmission by using the optimal settings in all the mass-production apparatuses without being affected by the various variation factors. Accordingly, the signal transmission apparatus according to the present embodiment is capable of processing a large amount of data and easily achieving a high reliability. Furthermore, when the load is varied or the transmission line is changed, it is possible to constantly realize the stable signal transmission apparatus by performing the optimization again.

Specific examples of the operation of the signal transmission apparatus according to the present embodiment will now be described.

FIG. 5 is a table illustrating an example of the determination table according to the present embodiment. The determination table in FIG. 5 is created based on the datasheets of the transmission LSI 11 and the reception LSI 12 and includes three types of determination patterns. A determination pattern number, a frequency range, a multi-value number, an insertion loss (IL) condition, and a reflection loss (RL) condition are specified for each determination pattern. The insertion loss (IL) condition and the reflection loss (RL) condition correspond to the S parameter conditions. In the example in FIG. 5, the transmission LSI 11 and the reception LSI 12 have a multi-value number of eight when the transmission clock frequency ranges from 1 GHz to 2 GHz, have a multi-value number of four when the transmission clock frequency ranges from 1 GHz to 3 GHz, and have a multi-value number of two when the transmission clock frequency ranges from 1 GHz to 5 GHz.

In the table shown in FIG. 5, the insertion loss (SDD 21) of a determination pattern 1 is denoted by IL1 and the reflection loss (SDD 11) of the determination pattern 1 is denoted by RL1. The insertion loss (SDD 21) of a determination pattern 2 is denoted by IL2 and the reflection loss (SDD 11) of the determination pattern 2 is denoted by RL2. The insertion loss (SDD 21) of a determination pattern 3 is denoted by IL and the reflection loss (SDD 11) of the determination pattern 3 is denoted by RL.

Figure 6:
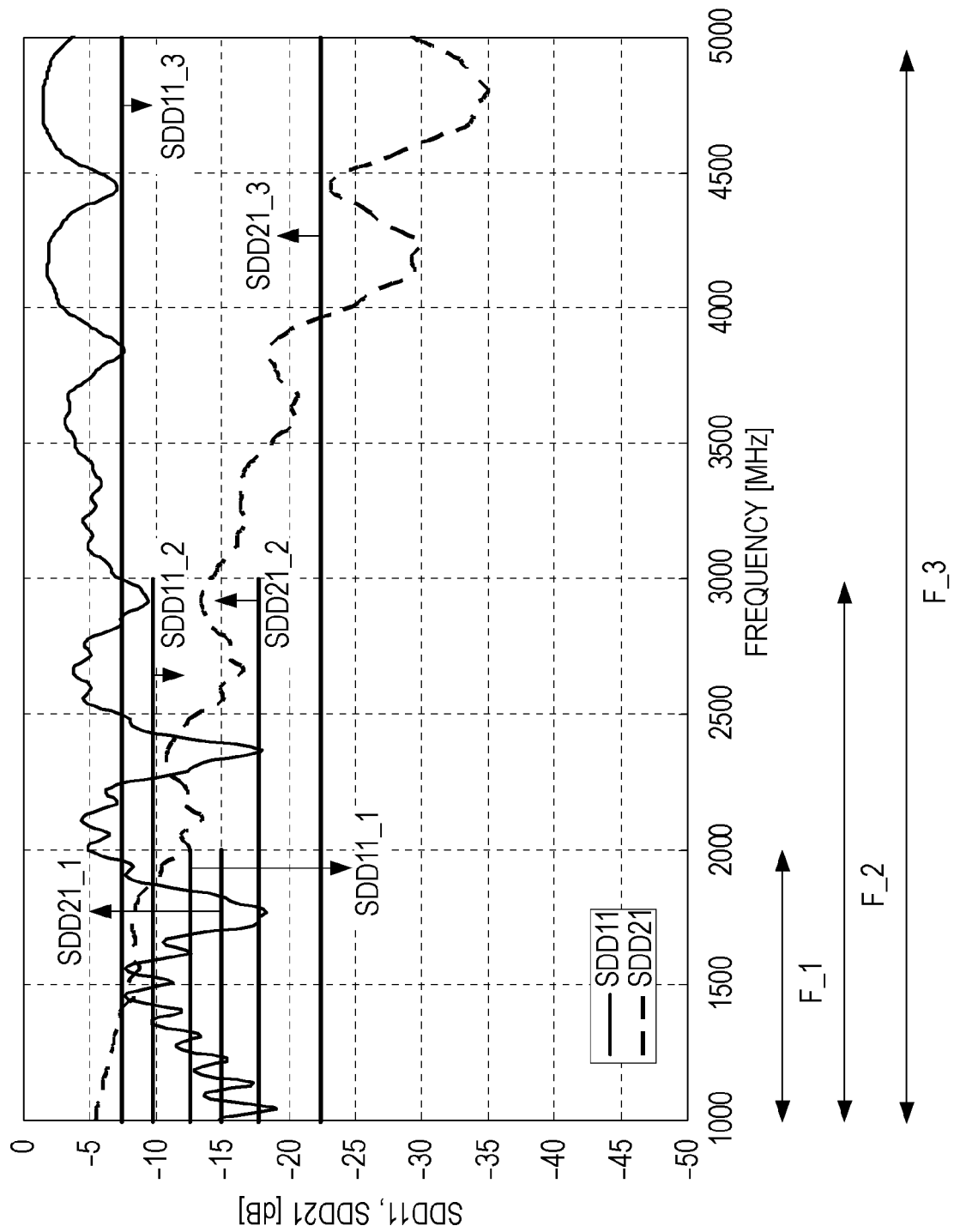
FIG. 6 is a graph illustrating examples of S parameter measurement values according to the present embodiment.

In the S parameter measurement process, the SDD 21 (the differential insertion loss) and the SDD 11 (the differential reflection loss) are measured and the measured SDD 21 and SDD 11 are used as the S parameter measurement values. FIG. 6 is a graph illustrating examples of the S parameter measurement values according to the present embodiment. Referring to FIG. 6, the horizontal axis represents frequency [MHz] and the vertical axis represents SDD 21 or SDD 11 [dB]. The measurement values on a solid line indicate the SDD 11 and the measurement values on a broken line indicate the SDD 21.

"F_1" denotes the frequency range of the determination 1, "SDD 21_1" denotes the range of the SDD 21 satisfying the insertion loss condition of the determination pattern 1, and "SDD 11_1" denotes the range of the SDD 11 satisfying the reflection loss condition of the determination pattern 1. Similarly, "F_2" denotes the frequency range of the determination 2, "SDD 21_2" denotes the range of the SDD 21 satisfying the insertion loss condition of the determination pattern 2, and "SDD 11_2" denotes the range of the SDD 11 satisfying the reflection loss condition of the determination pattern 2. Similarly, "F_3" denotes the frequency range of the determination 3, "SDD 21_3" denotes the range of the SDD 21 satisfying the insertion loss condition of the determination pattern 3, and "SDD 11_3" denotes the range of the SDD 11 satisfying the reflection loss condition of the determination pattern 3.

FIG. 7 is a table illustrating examples of the determination results of the S parameter conditions in the frequency and multi-value number determination process according to the present embodiment. The table in FIG. 7 shows the determination result (○ or ×) of the insertion loss condition and the determination result (○ or ×) of the reflection loss condition, in addition to the determination patterns in the example of the determination table shown in FIG. 5.

When the importance on the transmission quality is specified as the determination criterion, the determination patterns 2 and 3 are selected as the determination patterns in which the S parameter measurement values satisfy the S parameter conditions. Then, the determination pattern 2 is selected as the determination pattern having the minimal multi-value number larger than two. Specifically, the optimal frequency range is determined to be 1 GHz to 3 GHz and the optimal multi-value number is determined to be four. In addition, the optimal frequency is determined to be 2.43 GHz based on the S parameter characteristic. The optimal frequency is the highest frequency which is within the optimal frequency range and at which the S parameter measurement value satisfies the S parameter condition.

The transmission capacity when this optimal frequency and this optimal multi-value number are used is calculated according to the following equation: 2.43 GHz (the transmission clock frequency)×2×2=9.72 Gbps. FIG. 8 is a waveform diagram illustrating an example of the eye pattern of a reception signal according to the present embodiment. Referring to FIG. 8, the horizontal axis represents time and the vertical axis represents reception voltage. In the example in FIG. 8, the optimal frequency is equal to 2.43 GHz, the optimal multi-value number is equal to four, and "T" denotes a transmission clock cycle (1/the transmission clock frequency). In this example, T=1/2.43 [GHz]=412 [psec]. "1 unit interval (UI)" denotes a time interval of one symbol (the transmission clock cycle/2). In this example, 1 UI=412 [psec]/2=206 [psec]. At a data determination timing D, the level of the reception voltage can take any of the four values.

In the optimization of the binary modulation using the determination pattern 3, the multi-value number is equal to two, the transmission clock frequency is equal to 3.83 GHz, and the transmission capacity is equal to 3.83 GHz×2=7.66 Gbps. Accordingly, the transmission capacity optimized when the importance on the transmission quality is specified as the determination criterion is 1.27 times larger than the optimized transmission capacity of the binary modulation.

When the importance on the transmission capacity is specified as the determination criterion, the determination pattern 1 is selected as the determination pattern having the highest multi-value number. Specifically, the optimal frequency range is determined to be 1 GHz to 2 GHz and the optimal multi-value number is determined to be eight. In addition, the optimal frequency is determined to be 1.86 GHz based on the S parameter characteristic. The optimal frequency is the highest frequency which is within the optimal frequency range and at which the S parameter measurement value satisfies the S parameter condition.

The transmission capacity when this optimal frequency and this optimal multi-value number are used is calculated according to the following equation: 1.86 GHz (the transmission clock frequency)×2×3=11.16 Gbps. Accordingly, the transmission capacity optimized when the importance on the transmission capacity is specified as the determination criterion is higher than the transmission capacity optimized when the importance on the transmission quality is specified as the determination criterion. As a result, the optimal frequency and the optimal multi-value number in the case of the importance on the transmission capacity is selected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A signal transmission apparatus that transmits a signal through a transmission line, the signal transmission apparatus comprising:
    a first-signal transmitting unit configured to transmit a first signal, used for measuring a characteristic of the transmission line, to the transmission line;
    a reflection-characteristic measuring unit configured to measure a reflection characteristic of the transmission line based on a signal resulting from reflection of the first signal from the transmission line;
    a transmission-characteristic measuring unit configured to measure a transmission characteristic of the transmission line based on a signal resulting from transmission of the first signal through the transmission line;
    a determining unit configured to determine a transmission clock frequency and a multi-value number based on the reflection characteristic measured by the reflection-characteristic measuring unit, and the transmission characteristic, measured by the transmission-characteristic measuring unit;
a second-signal transmitting unit configured to modulate information using the transmission clock frequency and the multi-value number, determined by the determining unit to transmit a second signal resulting from the modulation to the transmission line; and
a second-signal receiving unit configured to receive and demodulate the second signal, which is transmitted from the second-signal transmitting unit and passes through the transmission line.

2. The signal transmission apparatus according to claim 1, wherein the determining unit stores at least one determination pattern resulting from a combination of a transmission clock frequency condition, a multi-value number condition, a reflection characteristic condition, and a transmission characteristic condition, and determines a range of the transmission clock frequency and a range of the multi-value number, the respective ranges satisfying the determination pattern.

3. The signal transmission apparatus according to claim 1, wherein the determining unit selects the transmission clock frequency and the multi-value number having a highest transmission capacity from within the determined range of the transmission clock frequency and the determined range of the multi-value number.

4. The signal transmission apparatus according to claim 1, wherein multiple transmission lines are provided, and the second-signal transmitting unit detects an open lane from the multiple transmission lines and turns off output through the open lane.

5. The signal transmission apparatus according to claim 1, wherein the determining unit measures a transmission quality on the transmission line to set the measured transmission quality as a transmission quality measurement result and optimizes an amplification characteristic used for the transmission by the first-signal transmitting unit, an emphasis characteristic used for the transmission by the second-signal transmitting unit, and an equalization characteristic used for the reception by the second-signal receiving unit, based on the transmission quality measurement result.

6. The signal transmission apparatus according to claim 5, wherein determination of the transmission quality includes measuring an eye opening, and
wherein the determining unit acquires multiple combinations of the amplification characteristic setting, the emphasis characteristic setting, and the equalization characteristic setting, performs the measurement of the transmission quality for each combination, and selects a combination in which the eye opening is equal to a central value to set the selected combination in the second-signal transmitting unit and the second-signal receiving unit in order to transmit the information.

7. The signal transmission apparatus according to claim 5, wherein determination of the transmission quality includes measuring an eye opening and an error rate, and
wherein the determining unit acquires multiple combinations of the amplification characteristic setting, the emphasis characteristic setting, and the equalization characteristic setting, performs the measurement of the transmission quality for each combination, and selects a combination in which the error rate satisfies a predetermined error-rate condition and the eye opening is equal to a central value to set the selected combination in the second-signal transmitting unit and the second-signal receiving unit in order to transmit the information.

8. The signal transmission apparatus according to claim 5, wherein the transmission quality includes an error rate, and
wherein the determining unit acquires multiple combinations of the amplification characteristic setting, the emphasis characteristic setting, and the equalization characteristic setting, performs the measurement of the transmission quality for each combination, and selects a combination in which a minimal error rate is achieved to set the selected combination in the second-signal transmitting unit and the second-signal receiving unit in order to transmit the information.

9. The signal transmission apparatus according to claim 5, wherein the determining unit measures the transmission quality and performs the optimization before the information is transmitted.

10. The signal transmission apparatus according to claim 5, wherein the determining unit measures the transmission quality and performs the optimization if a transmission load of the transmission line is varied.

11. The signal transmission apparatus according to claim 5, wherein the reflection characteristic is the frequency characteristic of a reflection loss among S parameters, and the transmission characteristics is the frequency characteristic of an insertion loss among the S parameters.

12. A signal transmission method for transmitting a signal through a transmission line, the signal transmission method comprising:
transmitting a first signal used for measuring a characteristic of the transmission line to the transmission line;
measuring a reflection characteristic of the transmission line based on a signal resulting from reflection of the first signal from the transmission line and measuring a transmission characteristic of the transmission line based on a signal resulting from transmission of the first signal through the transmission line;
determining a transmission clock frequency and a multi-value number based on the measured reflection characteristic and the measured transmission characteristic;
modulating information using the determined transmission clock frequency and the determined multi-value number to transmit a second signal resulting from the modulation to the transmission line; and
receiving and demodulating the second signal, which is transmitted and passes through the transmission line.

13. The signal transmission method according to claim 12, wherein at least one determination pattern resulting from a combination of a transmission clock frequency condition, a multi-value number condition, a reflection characteristic condition, and a transmission characteristic condition is stored, and a range of the transmission clock frequency and a range of the multi-value number are determined, the ranges satisfying the determination pattern.

14. The signal transmission method according to claim 12, wherein the transmission clock frequency and the multi-value number having a highest transmission capacity are selected from within the determined range of the transmission clock frequency and the determined range of the multi-value number.

15. The signal transmission method according to claim 12, wherein multiple transmission lines are provided, and an open lane is detected from the multiple transmission lines and output through the open lane is turned off.

16. The signal transmission method according to claim 12, wherein a transmission quality on the transmission line is measured to set the measured transmission quality as a transmission quality measurement result, and an amplification characteristic used for the transmission of the first signal, an emphasis characteristic used for the transmission of the second signal, and an equalization characteristic used for the reception of the second signal, are optimized based on the transmission quality measurement result.

17. The signal transmission method according to claim 16, wherein determination of the transmission quality includes measuring an eye opening, and
wherein multiple combinations of the amplification characteristic setting, the emphasis characteristic setting, and the equalization characteristic setting are acquired, the transmission quality is measured for each combination, and a combination in which the eye opening is equal to a central value is selected to set the selected combination in order to transmit the information.

18. The signal transmission method according to claim 16, wherein determination of the transmission quality includes measuring an eye opening and an error rate, and
wherein multiple combinations of the amplification characteristic setting, the emphasis characteristic setting, and the equalization characteristic setting are acquired, the transmission quality is measured for each combination, and a combination in which the error rate satisfies a predetermined error-rate condition and the eye opening is equal to a central value is selected to set the selected combination in order to transmit the information.

19. The signal transmission method according to claim 16, wherein the transmission quality includes an error rate, and
wherein multiple combinations of the amplification characteristic setting, the emphasis characteristic setting, and the equalization characteristic setting are acquired, the transmission quality is measured for each combination, and a combination in which the minimal error rate is achieved is selected to set the selected combination in order to transmit the information.

20. The signal transmission method according to claim 16, wherein the transmission quality is measured and the optimization is performed before the information is transmitted.

* * * * *